(12) United States Patent
Siedlarczyk

(10) Patent No.: US 6,349,653 B1
(45) Date of Patent: Feb. 26, 2002

(54) MAINTENANCE CART FOR REMOTE INSPECTION AND CLEANING OF CLOSED TRACK

(75) Inventor: Irene M. Siedlarczyk, Johnson City, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/548,019

(22) Filed: Apr. 12, 2000

(51) Int. Cl.7 .............................. B61F 19/00; E01H 8/10
(52) U.S. Cl. ........................... 104/279; 348/148; 15/54; 15/340.1
(58) Field of Search ........................ 104/279; 348/148; 15/54, 340.1

(56) References Cited

U.S. PATENT DOCUMENTS

| | | | |
|---|---|---|---|
| 335,623 A | * | 2/1886 | Reynolds ..................... 15/54 |
| 3,034,236 A | * | 5/1962 | Pyke ........................... 37/211 |
| 5,185,700 A | * | 2/1993 | Bezos et al. ........... 364/424.04 |
| 5,333,724 A | | 8/1994 | Wingfield et al. |
| 5,445,080 A | | 8/1995 | Austin |
| 5,671,679 A | | 9/1997 | Straub et al. |
| 5,706,932 A | | 1/1998 | White |
| 6,064,428 A | * | 5/2000 | Trosino et al. ............... 348/148 |

FOREIGN PATENT DOCUMENTS

EP  0 534 077 A1  9/1991

* cited by examiner

Primary Examiner—Stephen T. Gordon
Assistant Examiner—Greg Blankenship
(74) Attorney, Agent, or Firm—Whitam, Curtis & Christofferson, P.C.

(57) ABSTRACT

A maintenance cart in a maintenance system is substituted for a material handling cart in a continuous train of material handling carts circulating on a closed track. The maintenance cart includes both inspection and cleaning functions which may be divided among separate maintenance carts, as desired. Inspection includes location sensing (preferably with a bar-code reader), inspection with one or more television-like cameras and clearance measurements. Cleaning functions include removal of dust and debris from a channel-like track by a vacuum arrangement. The maintenance cart or carts may be continuously left in place or substitute as needed in the train and provide continuous cleaning service and system diagnostics for scheduling repairs prior to failure while in use. The system is particularly advantageous for application to mail sorting systems which are largely unaccessible and which permit only brief time windows during which maintenance, repair and inspection can otherwise be carried out.

28 Claims, 3 Drawing Sheets

MAINTENANCE CART FOR REMOTE INSPECTION AND CLEANING OF CLOSED TRACK

BACKGROUND OF THE INVENTION

1. Field of the Invention

The present invention generally relates to material handling systems and, more particularly, to inspection and maintenance of such systems, especially those adapted for article sorting such as mail handling systems.

2. Description of the Prior Art

At the present time, many manufacturing and service industries make extensive use of material handling machinery for transporting and/or sorting of large volumes of objects. An exemplary application of such machinery is that of sorting articles in accordance with a designated destination by delivery services such as the United States Postal Service. Such services usually provide for transportation of articles such as cards, letters, parcels and the like from a large number of deposit sites to centralized local sorting facilities where the articles are sorted in accordance with transportation routes to similar facilities where further sorting by delivery routes is performed near the ultimate destinations of the articles. Further sorting processes may be included to accommodate extensive deposit and delivery areas with increased efficiency even though a single sorting process may provide sorting into hundreds of groups.

To automate the sorting process, a conveyor arrangement is often employed in combination with an arrangement for removing an article from the conveyor at a selected location. One such system in widespread use involves a conveyor comprising an endless train of carts circulating on a closed track on which the carts are captive. Each cart is provided with a tiltable tray for carrying articles and discharging them to either side of the closed track at appropriate locations under dynamically configurable computer control.

In such systems, the number of groups or classes into which articles may be sorted is only limited by the length of the closed track which may be physically accommodated within a particular facility and the nominal width in the direction of the track of a discharge station. Track lengths generally range between three hundred sixty feet and two thousand feet although larger or smaller installations are possible. Discharge or sort locations are somewhat larger in size than the length of carts which are provided and the carts are generally sized in accordance with the largest articles to be accommodated.

For mail sorting, a cart length of about eighteen inches is usually adequate. Thus, roughly two discharge locations can potentially be provided for each four feet of track (one on each side of the track) although some potential discharge locations must be used for loading articles onto the carts and other potential discharge locations are lost to curves in the closed track. Thus, even the smaller installations can generally provide at least one hundred sort classes or groups and potentially many more if increased track length can be accommodated in a given facility.

For such systems to operate at acceptably high speeds and without damage to the articles, the entire arrangement is fabricated with high precision and must be frequently maintained to avoid malfunction. For example, the closed track is generally formed of modular multi-suspension units which have a number of components such as shifting rails, alignment rails, code readers and linear motors which require inspection on a quarterly or semi-annual basis. The modular multi-suspension units are closed at the bottom for safety reasons and require vacuuming nominally on a semi-annual basis depending on environmental conditions at each location.

To allow multiple use of the large area required for such installations as well as article transport from the discharge locations, the multi-suspension units of the closed track are generally suspended fifteen to thirty feet above workroom floor level which is densely populated with additional article processing equipment and associated personnel. This location is not alterable consistent with efficient operations and space usage even though it presents significant difficulties in accessibility of the track for maintenance activities. Accordingly, maintenance personnel must use lifting devices such as so-called scissors lifts and cherry pickers to perform maintenance operations. In extreme instances, scaffolding must be built or the maintenance technician must work in a safety harness (which is precluded by safety regulations in some facilities).

Current cleaning and inspection procedures also require that the sorter/conveyor system be shut down and a number of the carts (generally five to ten, approximately corresponding to one or two modular multi-suspension units of the track) removed from the track to expose the track interior for inspection, cleaning and/or other maintenance. This removal is usually performed at a maintenance platform constructed at the track level. The train of carts is then advanced until the opening in the train of carts exposes the specific region of the track scheduled for cleaning and/or inspection. Once maintenance operations are completed on that region of the track, the train of carts may be advanced to expose additional areas of the track. When scheduled operations are completed or the sorter must be returned to service, the carts are replaced and normal operation of the sorter/conveyor is resumed.

It can be understood that this invasive operation precludes normal operation of the sorter/conveyor and even installations with very short track lengths cannot have cleaning and inspections performed for the entirety of the track in any single maintenance time window. In general, current and proposed installations are intended to operate every day with only two to four hour maintenance windows available on low volume days. No maintenance window is available at all during high volume periods when the consequences of a malfunction would be especially severe. In general, it is also estimated to be likely that approximately one thousand labor hours per year (for sorters of average size) will be required for maintenance activities on each sorter.

Thus, it can be seen that the ability to schedule adequate time for maintenance activities during the course of a year is marginal, at best, and impossible on sorters having relatively long track lengths. Additionally, it should be appreciated that required repairs must be accommodated and may preclude scheduled maintenance operations. Such repairs cannot presently be scheduled except to the slight degree that inspection during maintenance periods may allow a small percentage of malfunctions to be forecast. Thus otherwise routine repairs are only possible after a failure has occurred and the use of the sorter has been lost; substantially engendering an emergency to return the sorter to service.

SUMMARY OF THE INVENTION

It is therefore an object of the present invention to provide a method and apparatus for performing cleaning and inspection operations during normal operations of a sorter/conveyor.

It is another object of the invention to provide a maintenance cart by which cleaning and inspection operations may be performed remotely.

It is a further object of the invention to provide for communication of information from the sorter apparatus to report operating condition of the sorter and to indicate an impending need for repair and the exact location thereof.

It is yet another object of the invention to provide a method and apparatus capable of performing inspection and cleaning operations in reduced time and increased safety for personnel.

In order to accomplish these and other objects of the invention, a maintenance system for a material handling system having a track and a plurality of similarly dimensioned material handling carts connected in a continuous train and a maintenance cart therefor are provided comprising a cart chassis similarly dimensioned to a chassis of a material handling cart, an inspection and illumination system including at least one camera, and an illumination source, a position locating system for identifying a location of the camera relative to the track, and a telemetry transmitter for transmitting a signal representing at least an indication of the location of the maintenance cart and, preferably an image from the camera.

In accordance with another aspect of the invention, a maintenance cart for a material handling system having a track and a plurality of similarly dimensioned material handling carts connected in a continuous train is provided comprising a chassis similarly dimensioned to a chassis of a material handling cart, and a track cleaning system for removing material from the track and carried by said chassis of the maintenance cart.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
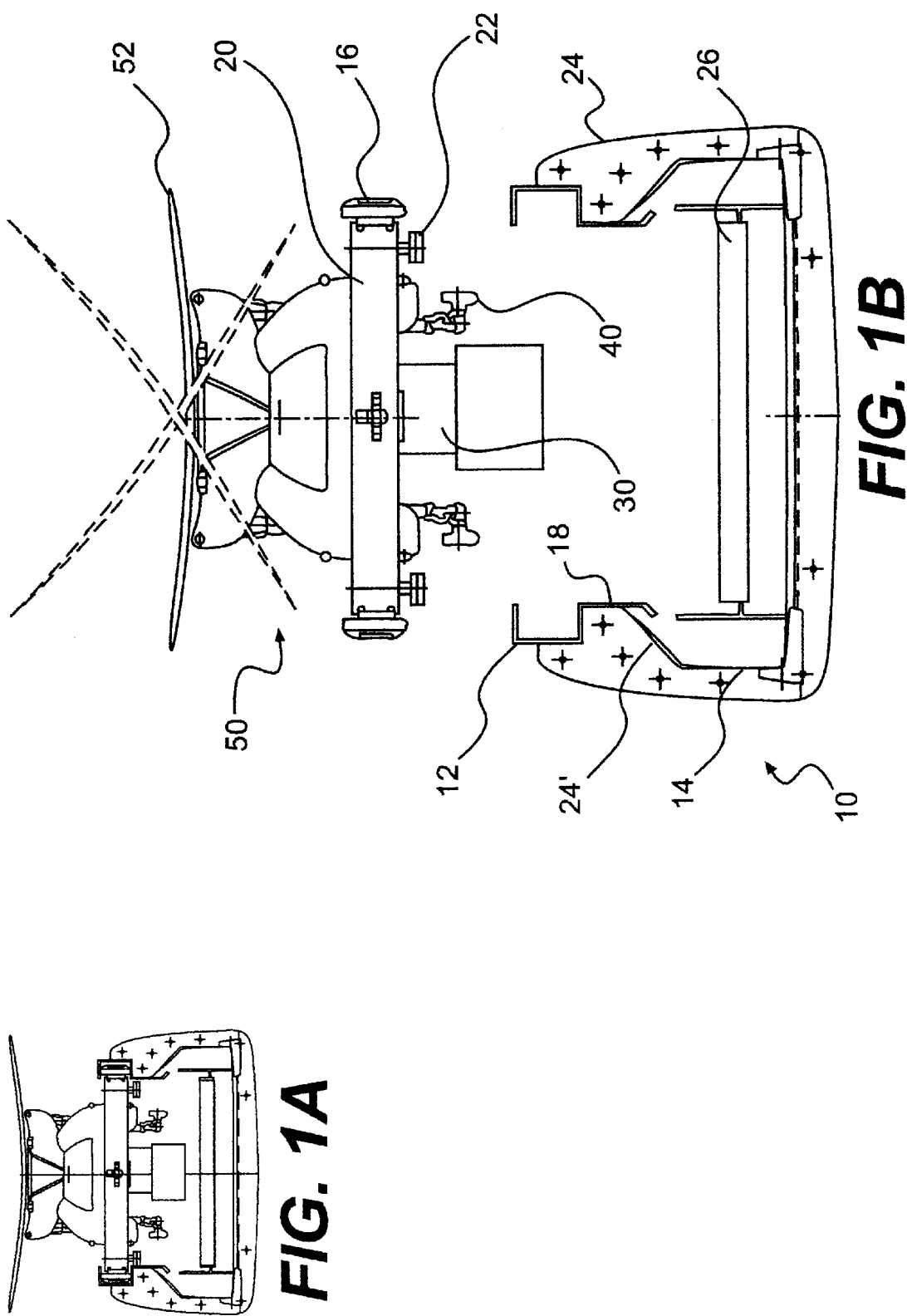
FIGS. 1A and 1B are an assembled and enlarged, partially disassembled cross-sectional views of an exemplary multi-suspension track module and a cart transported thereon.
Figure 2:
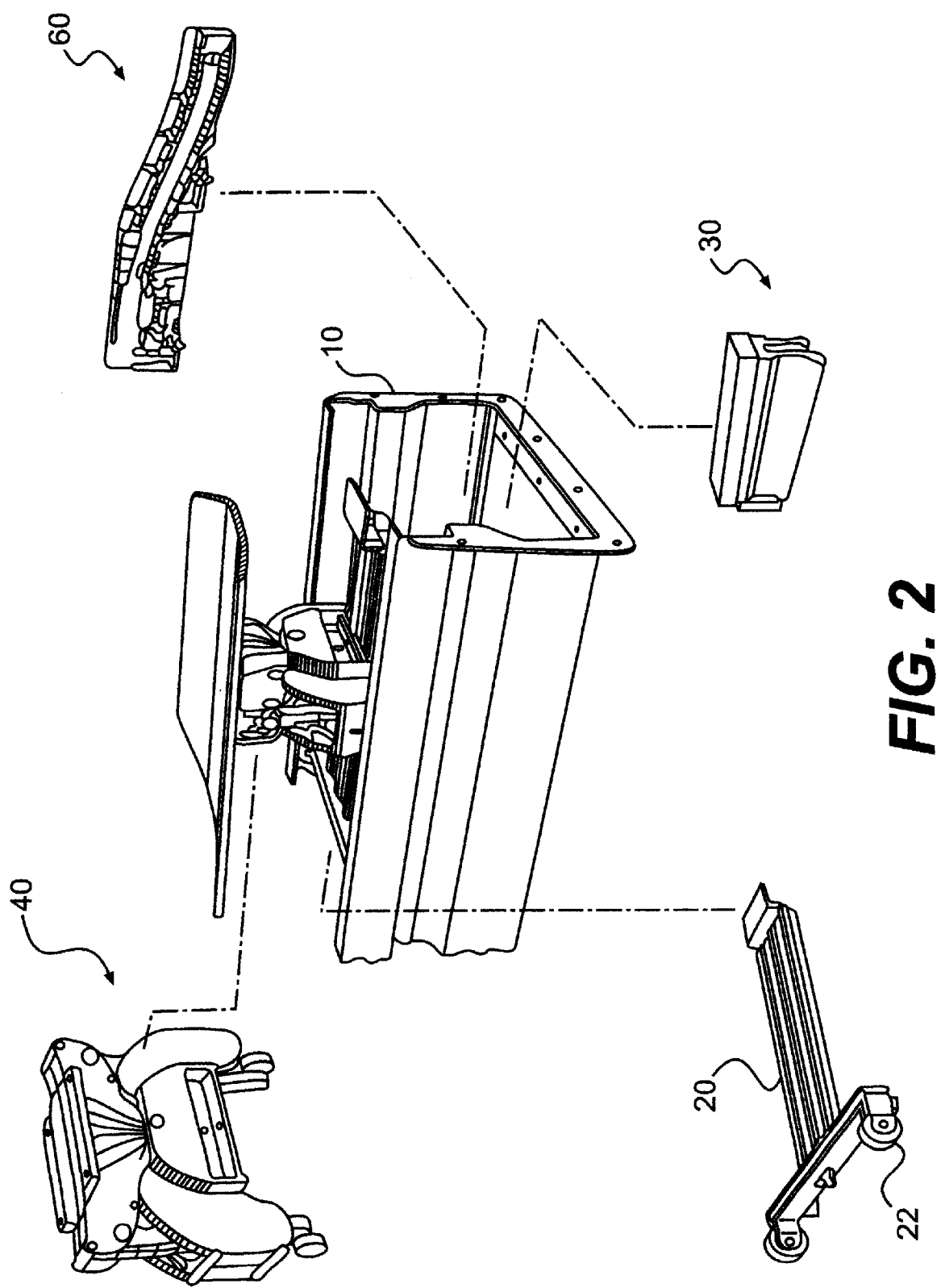
FIG. 2 is a partially exploded perspective view of the track and cart of FIGS. 1A and 1B.

Referring now to the drawings, and more particularly to FIGS. 1A, 1B and 2, there is shown an exemplary multi-suspension track (in cross-sectional view) and cart transportable thereon in accordance with a preferred environment of the invention. It should be understood that the preferred cart and track depicted are commercially available but are not admitted to be prior art. It should be further understood that the illustrated cart and track are presently preferred for commercial installations of the sorter but that the invention, as will be described below, and its basic principles are applicable to other closed track arrangements for material handling. Accordingly, details of the track and cart are not critical to the practice of the invention. Further, it should be understood that either the carts or track or both can be modified to accommodate particular properties of materials to be transported and/or sorted. As will be discussed below, the invention is applicable to any cart frame or track design that may be desired in a particular sorter or material handling installation.

The track 10 is preferably formed in upper and lower sections 12 and 14, respectively. These sections are basically channels of different forms; the upper channels being open inwardly to surround traveling wheels 16 and including a flange 18 against which guide wheels 22 can bear. The cart chassis 20, to which the traveling wheels 16 and guide wheels 22 are attached is thus held captive in the upper section of the track 12.

It should be noted in this regard that the cart chassis 20 is preferably formed in a T-shape and one (preferably front in the direction of cart travel) end of the chassis is coupled to and supported by the next cart in the train. When the carts are connected together, the axis of the traveling wheels 16 of each cart is substantially orthogonal to the track to maintain the carts captive therein. The carts then can be readily removed from the track by disconnecting the carts and rotating the cart within the track (to decrease the angle of the traveling wheel axis to the track direction) until it is released from the channels comprising the track.

The form of the lower section 14 of the track 10 is not at all critical to the practice of the invention but should be sized and configured to accommodate various arrangements to propel the cart and operate the various cart functions, generally indicated by multi-suspension element 26. The upper and lower track sections are appropriately spaced by flanges 24 which connect them and allow for respective modules of track 10 to be joined together. Additional crossbar connections 24' in similar form can be provided between the upper and lower sections of track 10, as desired, to obtain a sufficient or desired degree of rigidity.

As shown in FIG. 2, a linear motor module 30 and a tilt tray mechanism 40 are mounted on cart chassis 20. The linear motor module serves to propel the cart by interaction with magnetic elements supported by multi-suspension arrangement 26 of FIG. 1B (omitted from FIG. 2 for clarity). The tilt tray mechanism 50 supports a carrier tray 52 in a generally level position while allowing it to be tilted to either side to discharge an article or a container such as a standard postal bin. The tray is returned to a horizontal position after being moved to a tilted position by tilt wheel mechanism 40 of FIG. 2 engaging a cam mechanism 60 mounted within the lower section of the track. Again, these details described above should be understood as being preferred but not important to the practice of the invention except to the extent that malfunction could be caused by accumulated dust and debris within the track 10, shown in FIGS. 1B and 2, that could cause binding of precision parts.

Figure 3:
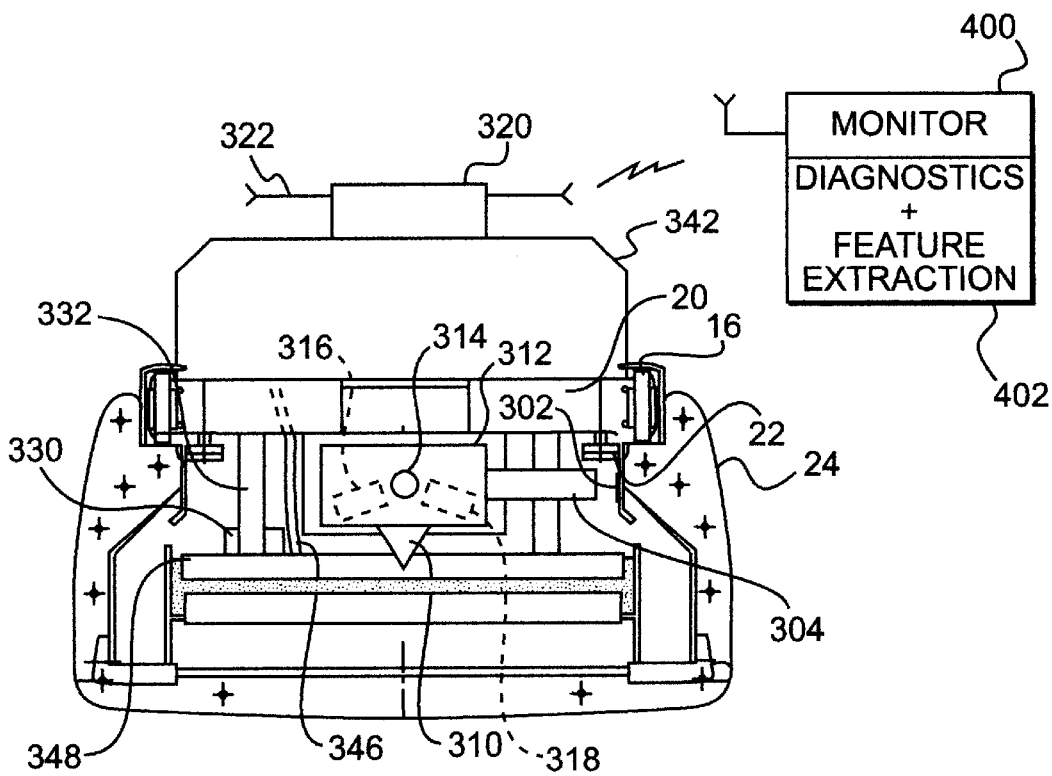
FIG. 3 is a rear view of a maintenance cart in accordance with the present invention.
Figure 4:
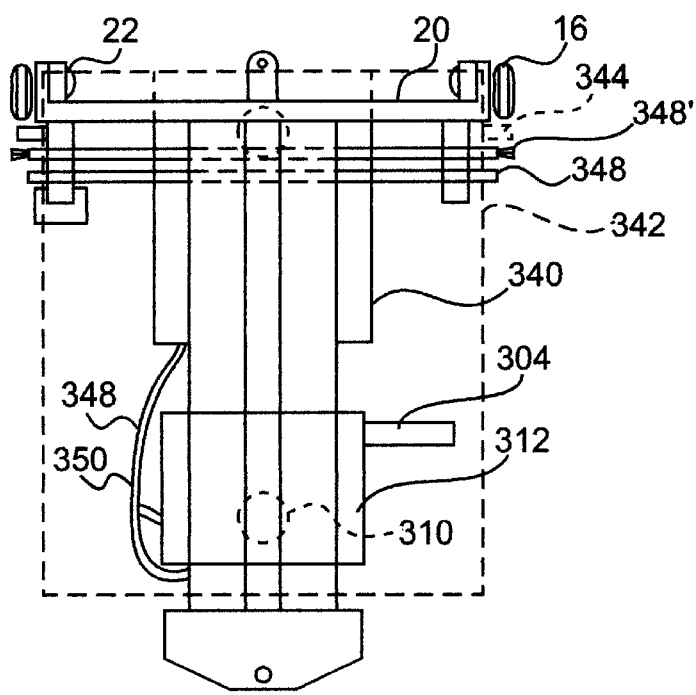
FIG. 4 is a top view of a maintenance cart in accordance with the present invention with some elements depicted in phantom for clarity.

Referring now to FIGS. 3 and 4, a maintenance cart in accordance with the invention will now be described. This maintenance cart, when in use, can provide continuous monitoring of track conditions and provide substantial maintenance services. The maintenance cart can be left in place in the train (at the cost of substitution for other carts and a consequent slight reduction in sorter capacity (less than 0.5% in even the smallest systems for one maintenance cart) or left in place on a substantially permanent basis (e.g. removed only when the maintenance cart itself must be maintained or repaired).

It should also be understood that the various components of the maintenance cart in accordance with the invention are depicted in relatively high-level schematic form in the interest of clarity and since the specific constitution of any individual element is not important to the practice of the invention. Further, FIGS. 3 and 4 depict a preferred embodiment in which a number of different components, performing different functions, are depicted to show an exemplary arrangement allowing all functions and apparatus for performing them to be included in a single maintenance cart. It may be considered desirable to separate these components among two or more maintenance carts for particular maintenance needs of particular installations or if it is desired to provide other components providing further functions that may be found desirable.

In this regard, it may, for example, be preferable to separate the cleaning and inspection functions onto separate carts since the need for signaling/telemetry to a central computer or monitoring station 400 is principally an incident of inspection and would be minimal in support of the cleaning function. (For example the need for change of a dust collection receptacle could be satisfied by a simple alarm or annunciator.) Further, it may be desired to provide more than one cleaning cart on a continuous basis and/or to add an inspection cart to the sorter train only periodically while a cleaning cart was more-or-less permanently included.

FIG. 3 shows the track arrangement as discussed above in regard to FIG. 1B. No changes are required therein other than the periodic application of bar codes or other indicia 302 to the interior to identify particular exact locations in the track. Similarly, the cart chassis 20, including traveling wheels 16, and guide wheels 22, is unchanged from the chassis used in the standard cart of the system (which may or may not be in the preferred T-shaped configuration depicted). The tilting mechanism, tilt tray arrangement, and, preferably, linear motor, are simply removed from a standard cart otherwise usable on the system. In this regard, since one or more maintenance carts in accordance with the invention will represent only a very small fraction of the carts in even the smallest of installations, it is not necessary that maintenance carts be separately powered with linear motors. However, a linear motor or mock-up thereof could certainly be included if desired and may facilitate some maintenance operations.

For any remote inspection arrangement, it is necessary to identify the object being inspected, particularly where identifying characteristics are very few as is the case of trackage that must necessarily be very similar at all important (e.g. bearing) surfaces. To perform the function of location identification, the present invention preferably includes bar code indicia 302 on the interior of the track since error detection and correction and other problems such as relative motion between the indicia and sensor 304 are well-developed. Other types of indicia and sensing arrangements could also be used, such as by a distinctive index mark and other marks on respective track sections which are counted from the index mark. Sensor 304, of whatever type may be appropriate to the indicia (e.g. optical, magnetic, mechanical, etc.), is advantageously mounted on a housing 312 which may include inspection cameras (e.g. raster scanned image detectors or television cameras), an illumination arrangement 310 and other sensor arrangements and support electronics as may be desired.

For any remote inspection arrangement, it is necessary to identify the object being inspected, particularly where identifying characteristics are very few as is the case of trackage that must necessarily be very similar at all important (e.g. bearing) surfaces. To perform the function of location identification, the present invention preferably includes bar code indicia 302 on the interior of the track since error detection and correction and other problems such as relative motion between the indicia and sensor 304 are well-developed. Other types of indicia and sensing arrangements could also be used, such as by a distinctive index mark and other marks on respective track sections which are counted from the index mark. Sensor 304, of whatever type may be appropriate to the indicia (e.g. optical, magnetic, mechanical, etc.), is advantageously mounted on a housing 312 which may include inspection cameras (e.g. raster scanned image detectors or television cameras), an illumination arrangement 310 and other sensor arrangements and support electronics as may be desired.

Inspection cameras 314, 316 and 318 are preferably provided in housing 312. Three cameras pointed toward the front, left and right of the cart, respectively, and somewhat downwardly are preferred but fewer cameras with reflector arrangements for including two or more of these views in a single visual field could be used. The fields of view should include the bearing surfaces of the track, the multi-suspension arrangement including the magnets with which the linear motors interact, the tilting mechanisms and cooperating tilting elements in the track, and contacts for supplying power to the carts (if any, generally on the cart near the traveling wheels 16) to power, for example, lights sensors and vacuum. It may also be useful to include the location indicia 302 in the field of at least one inspection camera to determine the condition thereof and to provide a check of the location identifying arrangement.

A feeler gauge or optical (e.g. laser) measurement arrangement 330 to determine vertical position of the multi-suspension unit 26, shown in FIG. 1B and thus to measure or otherwise determine clearance between the multi-suspension units and the linear motors is preferably provided on the cart. This sensor may be provided on a linear motor or on other structure (e.g. strut 332) serving as a mock-up thereof although possibly provided for other purposes as will be discussed below. Additionally or alternatively a sensor can be provided on the multi-suspension unit with signal coupling to the cart as it passes or to a central monitor 400, preferably including a computer for diagnostics (e.g. by feature extraction and other known techniques 402). This is an important maintenance parameter since the efficiency of the linear motors is largely dependent on this clearance which must be small and multiple, possibly and or partially redundant arrangements may be preferred.

The above inspection and measurement arrangements are considered important to thorough inspection and condition monitoring of the track and carts. However, the invention can be practiced to advantage with more or fewer inspection and measurement systems than are discussed above. The images from cameras 314, 316 and 318 and the output of the clearance sensor 330, however constitute, are preferably communicated to a telemetry transmitter 320 with one or more antennas 322 for communication to a central monitor 400, alluded to above, the details of which are unimportant to the practice of the invention, For cleaning of the track, a motor and vacuum pump, preferably of the centrifugal type, are included in housing 340. The vacuum pump is connected to an appropriately sealed vacuum housing 342 advantageously mounted above the chassis 20 and indicated by dashed lines in FIG. 4. This housing is substantially rigid and the vacuum pump reduces pressure within it. A dust collection receptacle (e.g. a filter bag) is disposed within housing 342 and serves to filter dust and debris from air inlet thereto. In such an arrangement, air inlets can be provided at any point on the housing 342 such as at inlets 344, conveniently serving to clean the upper tracks 12 without requiring more than minimal ducting. An inlet and hose 346 can be conveniently provided to connect low pressure to a manifold 348 for cleaning the bottom of the track channel. Other inlets or ducts can be included as desired for any particular track configuration. Efficiency of any vacuum manifold or duct may be increased by placement of a brush (e.g. 348') to contact the surface closely behind the duct or manifold.

The exhaust from the vacuum pump may be directed in any convenient direction but preferably not in a forward direction within the track channel since doing so would raise dust that may settle on the optics of cameras 314, 316 and 318. However, if directed downwardly and somewhat backwardly of the cart, the exhaust can serve to loosen dust and debris to be picked up by vacuum manifold 348. A portion of the exhaust can also be advantageously diverted as illustrated at 350 to dislodge dust from the cameras 314, 316 and 318, clearance measurement arrangements 330, location sensor/bar-code reader 304, illumination diffuser 310 or any other more-or-less critical locations.

In view of the foregoing, a maintenance cart has been provided which is capable of continuous inspection and cleaning while the cart is in use. The cart is easily installed and removed from a conveyor/sorter apparatus having a track and is fully compatible with and can be substituted for any other cart in the system with negligible impact on system capacity. Inspection provided in accordance with the invention allows the scheduling of repairs prior to a need or failure of the system while maintenance in the nature of cleaning of the track can be performed continuously; extending system component life. The maintenance cart in accordance with the invention also provides for its own cleaning of critical parts therein. Maintenance and repair time as well as down-time of the system is minimized and scheduled to increase system capacity and substantially insure operation during critical periods of use.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A maintenance cart for a material handling system having a track and a plurality of similarly dimensioned material handling carts connected in a continuous train, said maintenance cart comprising
    a chassis similarly dimensioned to a chassis of a material handling cart,
    an inspection and illumination system including at least one camera, and an illumination source,
    a position locating system for identifying a location of said at least one camera relative to said track, and
    a telemetry transmitter for transmitting a signal representing an indication of said location and an image from said camera.

2. A maintenance cart as recited in claim 1, further including a second maintenance cart comprising
    a chassis similarly dimensioned to a chassis of a material handling cart, and
    a track cleaning system for removing material from said track and carried by said chassis of said second maintenance cart.

3. A maintenance cart as recited in claim 1, wherein said maintenance cart further comprises
    a track cleaning system for removing material from said track and carried by said chassis of said maintenance cart.

4. A maintenance cart as recited in claim 1, wherein said position locating system includes a bar code reader.

5. A maintenance cart as recited in claim 1, wherein said cart further includes clearance measurement means and said telemetry transmitter includes means for transmitting clearance information.

6. A maintenance cart as recited in claim 5, wherein said clearance measurement means is a feeler gauge.

7. A maintenance cart for a material handling system having a track and a plurality of similarly dimensioned material handling carts connected in a continuous train, said maintenance cart comprising
    a chassis similarly dimensioned to a chassis of a material handling cart, and
    a track cleaning system for removing material from said track and carried by said chassis of said maintenance cart.

8. A maintenance cart as recited in claim 7, further including
    an inspection and illumination system including at least one camera,
    a position locating system for identifying a location of said at least one camera relative to said track, and
    a telemetry transmitter for transmitting a signal representing an indication of said location.

9. A maintenance cart as recited in claim 8, wherein said position locating system includes a bar code reader.

10. A maintenance cart as recited in claim 8, wherein said cart further includes clearance measurement means and said telemetry transmitter includes means for transmitting clearance information.

11. A maintenance cart as recited in claim 10, wherein said clearance measurement means is a feeler gauge.

12. A maintenance system for a material handling system having a track and a plurality of similarly dimensioned material handling carts connected in a continuous train, said maintenance system including a maintenance cart comprising
    a chassis similarly dimensioned to a chassis of a material handling cart,
    an inspection and illumination system including at least one camera, and an illumination source,
    a position locating system for identifying a location of said at least one camera relative to said track, and
    a telemetry transmitter for transmitting a signal representing an indication of said location and an image from said camera.

13. A system as recited in claim 12, further including a second maintenance cart comprising
    a chassis similarly dimensioned to a chassis of a material handling cart, and
    a track cleaning system for removing material from said track and carried by said chassis of said second maintenance cart.

14. A system as recited in claim 12, wherein said maintenance cart further comprises
    a track cleaning system for removing material from said track and carried by said chassis of said maintenance cart.

15. A system as recited in claim 12, further including
    a central monitor for receiving said signal.

16. A system as recited in claim 12, wherein said track is a closed track.

17. A system as recited in claim 12, wherein said position locating system includes a bar code reader.

18. A system as recited in claim 12, wherein said cart further includes clearance measurement means and said telemetry transmitter includes means for transmitting clearance information.

19. A system as recited in claim 18, wherein said clearance measurement means is a feeler gauge.

20. A system as recited in claim 12, wherein said cart chassis is held captive in said track when connected to an adjacent cart.

21. A track as recited in claim 1, wherein said track is a closed track.

22. A maintenance cart as recited in claim 1, wherein the continuous train is an endless continuous train circulating on said track wherein said track is a closed track and the maintenance cart is interchangeable with any one of said plurality of similarly dimensioned material handling carts so that the endless continuous train remains the same length.

23. A maintenance cart as recited in claim 1, wherein the material handling system is a sorter/conveyor system.

24. A track as recited in claim 7, wherein said track is a closed track.

25. A maintenance cart as recited in claim 7, wherein the continuous train is an endless continuous train circulating on said track wherein said track is a closed track and the maintenance cart is interchangeable with any one of said plurality of similarly dimensioned material handling carts so that the endless continuous train remains the same length.

26. A maintenance cart as recited in claim 7, wherein the material handling system is a sorter/conveyor system.

27. A maintenance cart as recited in claim 12, wherein the continuous train is an endless continuous train circulating on said track wherein said track is a closed track and the maintenance cart is interchangeable with any one of said plurality of similarly dimensioned material handling carts so that the endless continuous train remains the same length.

28. A material handling system as recited in claim 12, wherein the material handling system is a sorter/conveyor system.

* * * * *